United States Patent [19]

Simmel

[11] Patent Number: 4,616,324

[45] Date of Patent: Oct. 7, 1986

[54] DIGITAL OVERCURRENT TRIPPING ARRANGEMENT

[75] Inventor: Hans-Eberhard Simmel, Karlsruhe, Fed. Rep. of Germany

[73] Assignee: Siemens Aktiengesellschaft, Munich, Fed. Rep. of Germany

[21] Appl. No.: 790,643

[22] Filed: Oct. 23, 1985

Related U.S. Application Data

[63] Continuation of Ser. No. 714,064, Mar. 20, 1985, abandoned, which is a continuation of Ser. No. 419,430, Sep. 17, 1982, abandoned.

[30] Foreign Application Priority Data

Sep. 21, 1985 [DE] Fed. Rep. of Germany ....... 3137496

[51] Int. Cl.[4] ..................... H02H 5/04; H02H 7/085; G06F 15/56
[52] U.S. Cl. .................................. 364/483; 364/492; 361/31; 361/96; 361/24
[58] Field of Search .................. 364/483, 492; 361/24, 361/93, 96, 103

[56] References Cited

U.S. PATENT DOCUMENTS

| | | | |
|---|---|---|---|
| 3,585,451 | 6/1971 | Day, III | 361/24 X |
| 4,072,997 | 2/1978 | Boothman et al. | 361/24 X |
| 4,153,924 | 5/1979 | Moran | 361/31 X |
| 4,195,254 | 3/1980 | Gurwicz et al. | 361/24 X |
| 4,291,355 | 9/1981 | Dinger | 364/31 |
| 4,328,551 | 5/1982 | Yamaura et al. | 364/492 |
| 4,345,292 | 8/1982 | Jaeschke et al. | 361/31 X |
| 4,377,836 | 3/1983 | Elms et al. | 361/96 |
| 4,446,498 | 5/1984 | Stich | 361/96 X |

FOREIGN PATENT DOCUMENTS 147595 4/1981 German Democratic Rep. .

Primary Examiner—Edward J. Wise
Attorney, Agent, or Firm—Kenyon & Kenyon

[57] ABSTRACT

A digital overcurrent tripping arrangement having a nonpermanent digital memory. The arrangement further contains a resistor-capacitor stage that simulates the cooling-down process of a body. In accordance with the invention, a microprocessor uses a thermal excitation state digital value stored in the nonpermanent memory to calculate a digital normalized voltage value which is then stored in the nonpermanent digital memory. A digital comparator means within the microprocessor compares the digital normalized voltage value in the nonpermanent memory with a digital output of an analog-to-digital converter, the digital output corresponding to a voltage across the resistor-capacitor stage. If they agree, a charging switch between a current supply and the resistor-capacitor stage is opened. Upon reconnection of the main current supply after disconnection, the microprocessor stores the digital output of the analog-to-digital converter in the nonpermanent memory, the digital output corresponding to a residual voltage across the resistor-capacitor stage.

2 Claims, 2 Drawing Figures

DIGITAL OVERCURRENT TRIPPING ARRANGEMENT

This application is a continuation of application Ser. No. 714,064, filed Mar. 20, 1985 abandoned, which is a continuation of Ser. No. 419,430, filed 9-17-82, now abandoned.

BACKGROUND OF THE INVENTION

This invention relates generally to overcurrent tripping devices, and more particularly, to a digital overcurrent tripping arrangement which contains a volatile digital memory for the thermal excitation state, and a microprocessor having an analog-to-digital converter.

It is generally known that the instantaneous thermal state prevailing in a system which has been disconnected by overcurrent tripping devices must be taken into consideration by the reconnecting facility. The thermal state prior to reconnection depends not only upon the state which existed during the tripping, but also on the time which has passed since the tripping during which time the disconnected system has cooled.

In known overcurrent tripping devices which operate thermally, the information relevant to the thermal tripping is stored in the form of heat. After responding, such overcurrent tripping devices cool off so that the cooling of the system after tripping can be taken into consideration automatically.

In known digitally operated overcurrent tripping devices on the other hand, a purely mathematical simulation of the thermal excitation state is performed in a microprocessor, where the numerical storage of this state occurs in a volatile memory, i.e., not permanent. If, as is done in practical systems, the digital overcurrent tripping device takes its supply energy from the network to be monitored, the digital information which is stored in the volatile memory disappears if the overcurrent tripping device responds, or the network to be monitored is otherwise switched off.

It is, therefore, an object of this invention to provide a digital overcurrent tripping arrangement wherein numerical values which correspond to a thermal excitation state are preserved when energy to the tripping arrangement is discontinued.

It is a further object of this invention to provide a digital overcurrent tripping arrangement wherein a cooling-down characteristic of the system is simulated.

SUMMARY OF THE INVENTION

The foregoing and other objects are achieved by this invention which provides a digital overcurrent tripping arrangement having a microprocessor with a volatile digital memory for the current excitation state and an analog-to-digital converter. In accordance with the invention, the arrangement is further provided with an additional permanent memory for storing the thermal excitation state after the system to be protected has been disconnected. Moreover, a resistor-capacitor (R-C) stage is charged with a predetermined voltage for simulating the cooling-down process. In this manner, the arrangement can be operated as a thermal overcurrent tripping device without the need for expensive, additional programming of the microprocessor.

In a further embodiment of the invention, the additional permanent memory may be of a type which requires a potential notwithstanding that the energy to the digital overcurrent tripping arrangement has been discontinued. Such a potential may be provided from a capacitor which has accumulated energy from the network prior to its being disconnected.

A further permanent memory can be provided in accordance with the invention at even less cost than a digital memory if it is designed as an analog memory. Such an analog memory may be an R-C stage which is additionally used for simulating the cooling-off process. If the R-C section is used as the analog memory, a normalized voltage is impressed on the stage prior to the overcurrent tripping device being tripped. This voltage is formed via a digital-to-analog converter from the contents of the volatile digital memory.

Alternatively, the R-C stage can be charged with the same effect, prior to the tripping, to a normalized voltage which is simulated via the analog-to-digital converter in the microprocessor, and a comparator, from the content of the volatile digital memory.

The cooling-down of a body is described to a first approximation by the following equation:

$$\zeta(t) = \zeta(t_o)\epsilon^{-\frac{t-t_o}{\tau}}$$

where $\zeta(t)$ represents the function of temperature over time. $\zeta(t_o)$ is the temperature in an initial state. As is evident, the cooling-down process follows an exponential law, where $\tau$ represents the cooling-down time constant. This cooling-down function corresponds in form to the discharge equation of an R-C stage:

$$V(t) = V(t_o)\epsilon^{-\frac{t-t_o}{\tau}}$$

Here, $V(t_o)$ is the voltage across the capacitor in the charged state, and $\tau$ is the time constant of the R-C stage. Thus, the thermal cooling-off can be simulated for a digital overcurrent tripping arrangement by a discharging R-C section which has been charged to a definite voltage prior to the failure of the supply energy. After the operating voltage is reconnected, the microprocessor of the digital overcurrent tripping arrangement enters the voltage present at the R-C section via an analog input; such a voltage being proportional to the new thermal starting excitation state of the overcurrent tripping arrangement.

BRIEF DESCRIPTION OF THE DRAWINGS

Comprehension of the invention is facilitated by reading the following detailed description in conjunction with the annexed drawings, in which.

DETAILED DESCRIPTION

Figure 1:
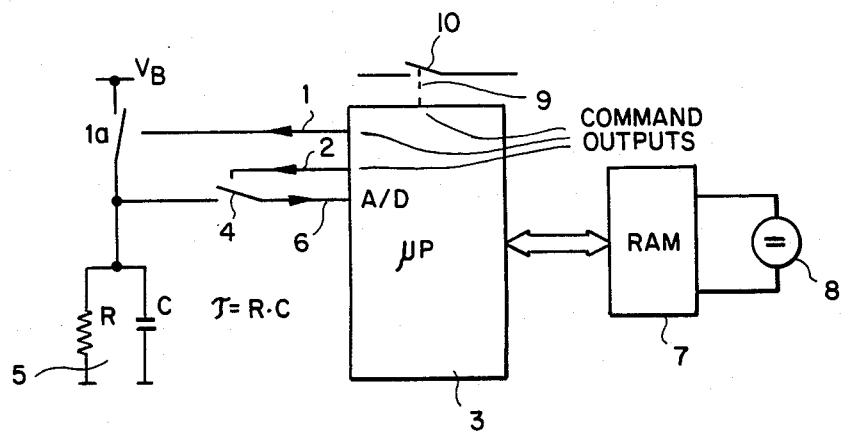
FIG. 1 is a block and schematic representation of an embodiment of the invention having an additional semiconductor memory (RAM) which is operated via a buffer battery so as to preserve the thermal excitation state upon triggering of the tripping arrangement.

FIG. 1 shows a microprocessor 3 having command outputs 1 and 2 for controlling switches 1a and 4. Switch 1a controls the application of an operating voltage $V_B$ which is applied to an R-C combination 5. The
} discharge voltage present at R-C stage 5 is conducted via switch 4, after switch 1a has been opened, to an input 6 of microprocessor 3. Input 6 of the microprocessor is connected to an analog-to-digital (A/D) converter. The microprocessor is further provided with a volatile memory (not shown) which is shunted by an additional memory 7 which receives its supply voltage from an energy storing device 8, and not, like the microprocessor, from the network to be protected. A further control output 9 of the microprocessor controls a tripping switch 10 which disconnects the network or system to be protected.

The thermal excitation state $\zeta(t_o)$ which is stored digitally in microprocessor 3 is transferred into buffered memory 7 if the supply energy fails. Simultaneously, R-C stage 5 is charged to a known voltage, specifically the supply voltage $V_B$, via switch 1a. A delay device (not shown) allows the failed supply voltage to be held for a time interval so as to permit the storing.

After the reconnection of the supply voltage, microprocessor 3 measures a voltage at R-C stage 5 which corresponds to:

$$V(t) = V_B \epsilon^{-\frac{t-t_o}{\tau}}$$

and in the additionally provided memory, the value for $\zeta(t_o)$ is found. After the voltage has been converted in an A/D conversion, microprocessor 3 calculates by simple multiplication the instantaneous thermal excitation state of the overcurrent tripping device, which designates as its new starting state:

$$\zeta(t) = \frac{V_B \epsilon^{-\frac{t-t_o}{\tau}}}{V_B} \zeta(t_o) = \zeta(t_o)\epsilon^{-\frac{t-t_o}{\tau}}$$

Figure 2:
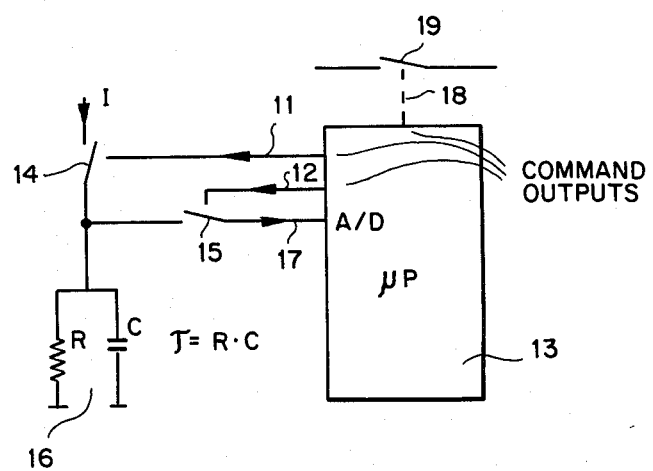
FIG. 2 is a block and schematic representation of an embodiment of the invention wherein the thermal excitation state is preserved upon the tripping of the arrangement, in a R-C stage which performs as an analog memory.

FIG. 2 shows a further embodiment of the invention which does not require any additional permanent memory. The embodiment is provided with a microprocessor 13 having control outputs 11 and 12 for controlling switches 14 and 15. Switch 14 serves to charge a R-C stage 16; the charging voltage being supplied via a switch 15 to an analog-to-digital converter (not shown) within microprocessor 13 via an input 17. The microprocessor is further provided with a control output 18 which is connected to a tripping switch 19.

In the embodiment of FIG. 2, the thermal excitation state is stored exclusively in R-C stage 16. For this reason, the thermal excitation state is normalized to a known value, illustratively $\zeta_a$. An analog voltage $V_N$ is assigned to the normalized quantity $\zeta(t_o)/\zeta_a$, in accordance with the expression:

$$V_N = \frac{\zeta(t_o)}{\zeta_a} V_{REF}$$

This normalized quantity is impressed on the R-C stage 16 prior to the failure of the supply voltage. In the embodiment of FIG. 2, this achieved by a feedback circuit which includes the A/D converter in the microprocessor. Upon triggering R-C stage 16, the stage charges with a current I which continues until a voltage which is measured by means of the A/D converter agrees with the value stored in the volatile memory of microprocessor 13.

After reconnecting the supply voltage, the voltage at the R-C stage is read into microprocessor 13 via the A/D converter therein, and is multiplied by the normalizing constant $\zeta_a$. For the voltage at the R-C stage, the following expression applies upon reconnection:

$$V(t) = \frac{\zeta(t_o)}{\zeta_a} \epsilon^{-\frac{t-t_o}{\tau}} V_{REF}$$

From this can be obtained the following expression for the thermal excitation state:

$$\rho(t) = \frac{V(t)}{V_{REF}} \zeta_a = \zeta(t_o)\epsilon^{-\frac{t-t_o}{\tau}}$$

Although the invention has been described in terms of specific embodiments and applications, persons skilled in the art, in light of this teaching, can generate additional embodiments without exceeding the scope or departing from the spirit of the claimed invention. For example, such skilled persons can produce a further embodiment wherein the charging voltage for the R-C stage 16 is generated directly upon release from the volatile memory via a digital-to-analog converter. Accordingly, it is to be understood that the drawings and descriptions in this disclosure are proffered to facilitate comprehension of the invention and should not be construed to limit the scope thereof.

What is claimed is:

1. In a digital overcurrent tripping arrangement with a disconnectable and reconnectable main current supply from a circuit to be monitored; a nonpermanent digital memory for storing digital values; and a resistor-capacitor stage chargeable with a voltage and having a discharge process to ground that simulates a cooling-down process of a body through a reduction of the voltage appearing across the resistor-capacitor stage, the improvement comprising:

a microprocessor that uses a thermal excitation state digital value stored in the nonpermanent digital memory to calculate a digital normalized voltage value which is then stored in the nonpermanent digital memory, the microprocessor having a command output;

an analog-to-digital converter, within the microprocessor, which has an analog input connectable to the resistor-capacitor stage and which has a digital output;

a charging switch connected between a current source and the resistor-capacitor stage and connected to the command output of the microprocessor;

a digital comparator means within the microprocessor which, while charging switch is closed, compares the digital normalized voltage value that is in the nonpermanent digital memory with a digital output of the analog-to-digital converter, the digital output corresponding to a voltage across the resistor-capacitor stage, the charging switch being opened by the comparator means by way of the command output of the microprocessor when the digital normalized voltage value agrees with the digital output of the analog-to-digital converter, whereupon reconnection of the main current supply after disconnection, the microprocessor stores the digital output of the analog-to-digital converter in the nonpermanent digital memory, the digital output corresponding to a residual voltage across the resistor-capacitor stage.

2. In a digital overcurrent tripping arrangement with a disconnectable and reconnectable main current supply from a circuit to be monitored; a nonpermanent digital memory for storing digital values; a permanent memory for storing digital values; and a resistor-capacitor stage chargeable with a voltage and having a discharge process to ground that simulates a cooling-down process of a body through a reduction of the voltage appearing across the resistor-capacitor stage, the improvement comprising:

a microprocessor having a command output;

an analog-to-digital converter, within the microprocessor, which has an analog input connectable to the resistor-capacitor stage and which has a digital output;

a charging switch connected between a voltage source and the resistor-capacitor stage and connected to the command output of the microprocessor, whereupon disconnection of the main current supply, the microprocessor transfers a thermal excitation state digital value, which is stored in the nonpermanent digital memory, to the permanent digital memory and the microprocessor closes the charging switch by way of the command output, resulting in the resistor-capacitor stage being charged by the voltage, whereupon reconnection of the main current supply, the microprocessor multiplies the digital output of the analog-to-digital converter, the digital output corresponding to a residual voltage across the resistor-capacitor stage, by the thermal excitation state digital value retrieved from the permanent digital memory by the microprocessor and stores the product in the nonpermanent digital memory.

* * * * *